United States Patent
Amro et al.

(10) Patent No.: US 7,159,018 B2
(45) Date of Patent: Jan. 2, 2007

(54) SYSTEM AND METHOD FOR INSTALLING SOFTWARE ONTO A BUILT-TO-ORDER COMPUTER SYSTEM USING AN IDENTIFICATION DEVICE

(75) Inventors: Hatim Y. Amro, Austin, TX (US); William P. Hyden, Round Rock, TX (US); Robert G. Nadon, Georgetown, TX (US); Steven D. Romohr, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 901 days.

(21) Appl. No.: 09/921,071

(22) Filed: Aug. 2, 2001

(65) Prior Publication Data

US 2003/0028629 A1 Feb. 6, 2003

(51) Int. Cl.
*G06F 15/177* (2006.01)
*G06F 9/445* (2006.01)

(52) U.S. Cl. .................. 709/221; 717/168; 717/169; 717/170; 717/171; 717/172; 717/173; 717/174; 717/175; 717/176; 717/177; 717/178; 709/220; 709/222

(58) Field of Classification Search ............. 709/221, 709/222, 220; 717/168–178; 713/1, 2; 700/1, 700/65, 96, 97, 95, 117
See application file for complete search history.

(56) References Cited

U.S. PATENT DOCUMENTS

| | | | |
|---|---|---|---|
| 5,247,683 A | | 9/1993 | Holmes et al. |
| 5,421,009 A | | 5/1995 | Platt |
| 5,794,052 A | | 8/1998 | Harding |
| 5,859,969 A | * | 1/1999 | Oki et al. .................. 709/201 |
| 5,950,010 A | * | 9/1999 | Hesse et al. ................ 709/220 |
| 5,978,590 A | * | 11/1999 | Imai et al. .................. 717/177 |
| 6,202,207 B1 | * | 3/2001 | Donohue .................... 709/221 |
| 6,226,412 B1 | * | 5/2001 | Schwab ...................... 370/282 |
| 6,301,707 B1 | * | 10/2001 | Carroll et al. .............. 717/177 |
| 2002/0095501 A1 | * | 7/2002 | Chiloyan et al. ........... 709/227 |
| 2002/0103952 A1 | * | 8/2002 | Thompson et al. ......... 710/104 |

* cited by examiner

*Primary Examiner*—John Follansbee
*Assistant Examiner*—Ashok Patel
(74) *Attorney, Agent, or Firm*—Haynes and Boone, LLP

(57) ABSTRACT

A system including a server, a computer system, and a device coupled to a port of the computer system is provided. The server includes a script associated with an identifier. The device includes the identifier. The computer system is configured to read the identifier from the device, provide the identifier to the server, and cause a script associated with the identifier to be executed to cause one or more software components to be installed onto the computer system.

19 Claims, 3 Drawing Sheets

SYSTEM AND METHOD FOR INSTALLING SOFTWARE ONTO A BUILT-TO-ORDER COMPUTER SYSTEM USING AN IDENTIFICATION DEVICE

BACKGROUND

The disclosures herein relate generally to computer systems and more particularly to a system and method for installing software onto a build-to-order computer system using an identification device.

In a build-to-order manufacturing process, a build-to-order computer system is assembled using hardware and software components specified by a customer. A list of the software components to be installed onto a build-to-order computer system is generated in response to an order placed by a customer. The list is accessed during the build-to-order manufacturing process to allow the software components specified by the customer to be installed onto a computer system. In order to access the list in an automated software installation environment, a build-to-order computer system needs some way to access the list. A floppy disk that includes an identifier associated with the list may be provided to a build-to-order computer system to allow the system to access the list. Floppy disks, however, are rapidly becoming obsolete.

It would be desirable to be able to install software onto a build-to-order computer system without the need for a floppy disk associated with the computer system. Accordingly, what is needed is a system and method for installing software onto a build-to-order computer system using an identification device.

SUMMARY

One embodiment, accordingly, provides a system including a server, a computer system, and a device coupled to a port of the computer system. The server includes a script associated with an identifier. The device includes the identifier. The computer system is configured to read the identifier from the device, provide the identifier to the server, and cause a script associated with the identifier to be executed to cause one or more software components to be installed onto the computer system.

A principal advantage of this embodiment is that various shortcomings of previous techniques are overcome. For example, software may be installed onto a build-to-order computer system in the factory without the need for a floppy disk associated with the computer system.

DETAILED DESCRIPTION

Figure 1:
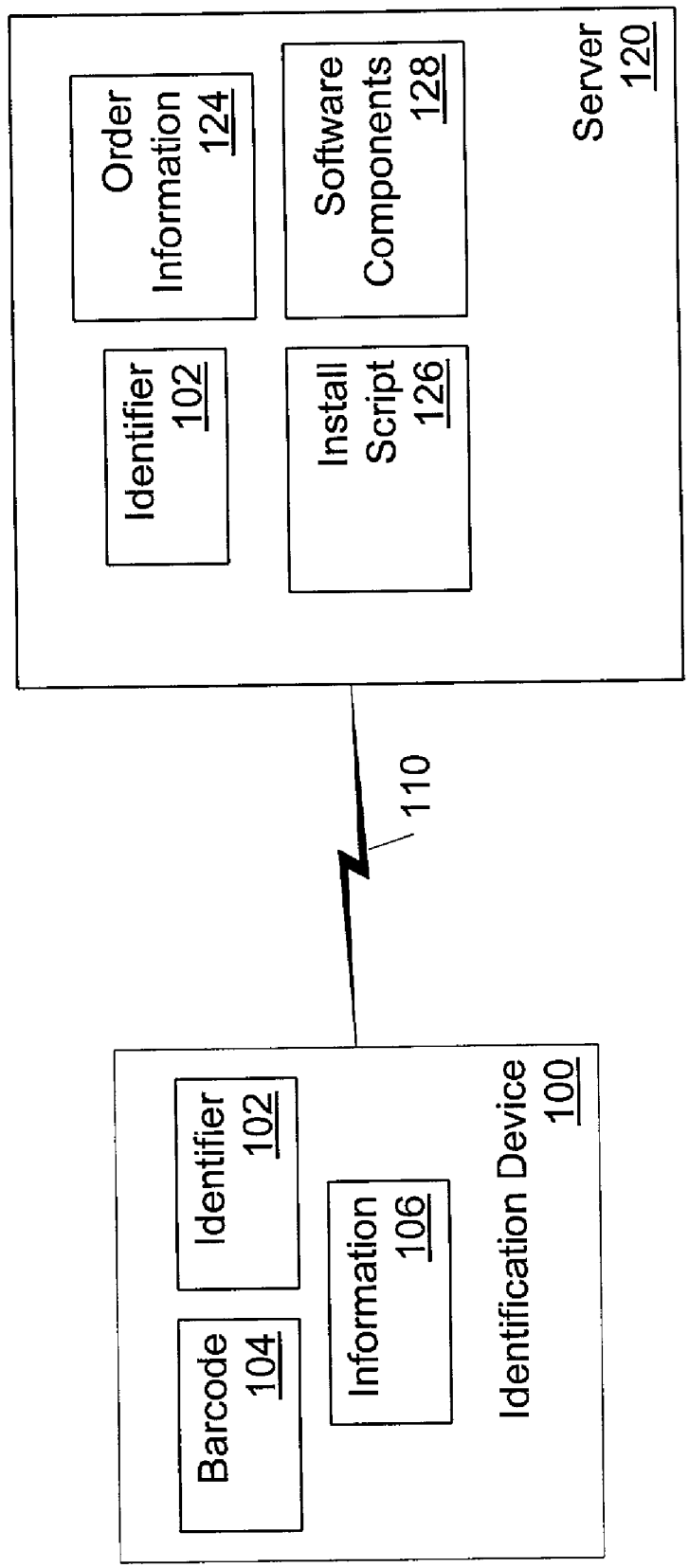
FIG. 1 is a diagram illustrating an embodiment of a system for associating an identifier from an identification device with order information stored on a server.

FIG. 1 is a diagram illustrating an embodiment of a system 10 for associating an identifier 102 from an identification device 100 with order information 124 stored on a server 120. In FIG. 1, identification device 100 communicates with server 120 using a communications network 110. Communications network 110 may be a local area network (LAN), a wide area network (WAN), an intranet, a global communications network such the Internet, a wireless connection, a point-to-point connection, or any other connection configured to allow identification device 100 to communicate with server 120.

Identification device 100 couples to a port of a computer system during a manufacturing process as described below in FIG. 2. For example, identification device 100 may be a dongle that couples to a serial port, Universal Serial Bus port, a parallel port, or other port of a computer system.

Identification device 100 includes identifier 102, barcode 104, and information 106. Identifier 102 is a number or other identifier stored onto identification device 100. Identification device 100 may be a programmable device where identifier 102 is programmable to a particular value such as a serial number. Identification device 100 may also be a non-programmable device where identifier 102 is a defined value and is not programmable. Barcode 104 is an identifier used to identify identification device 100. Barcode 104 may be a label attached to identification device 100 or may be any other indicator provided with identification device 100 that is capable of identifying identification device 100. Information 106 includes information associated with a computer system ordered by a customer. Information 106 may be used during a manufacturing process to cause functions associated with information 106 to be performed on a computer system. Identification device 100 may be part of a set of identification devices used by a manufacturer or vendor of a computer system. Where the set of identification devices are programmable devices, identifier 102 in each identification device may be programmed to a unique value such as a serial number, a lot number, or a manufacturing code. Where the set of identification devices are non-programmable devices, each identification device may be a unique identifier 102.

Server 120 includes order information 124, an install script 126, and software components 128. Order information 124 includes information associated with an order for a computer system from a customer. Order information 124 may specify one or more hardware components and one or more software components of the computer system. Accordingly, order information 124 may include a list of one or more hardware components and a list of one or more software components to be installed into the computer system. Order information 124 may be collected from the customer in any suitable way such as receiving an order from the customer using the Internet, receiving an order from the customer over the telephone, or receiving an order from the customer in person.

Install script 126 includes instructions configured to cause one or more of software components 128 to be installed onto a computer system ordered by a customer. Install script 126 will be described in additional detail below. Software components 128 may include the software components ordered by a customer or may include an inventory of software components available from a manufacturer or vendor of a computer system ordered by the customer.

As part of a process of manufacturing a computer system, identification device 100 is assigned to the computer system. To assign identification device 100 to a computer system, identifier 102 is stored along with order information 124 associated with the computer system on server 120. In one embodiment, identifier 102 is stored onto server 120 in response to barcode 104 being scanned. Barcode 104 is associated with identifier 102 and included into a parts list associated with the computer system. The parts list is included in order information 124 resulting in identifier 102 being stored on server 120. In other embodiments, identification device 100 is assigned to a computer system in other ways such as by reading identifier 102 directly onto server 100 or programming identification device 100 with a serial number or order number associated with the computer system.

In response to identification device 100 being assigned to a computer system, a identification device monitoring system (not shown) may designate a status associated with identification device 100 to be marked "in use" or some other designation to indicate that identification device 100 is currently assigned to a computer system. Prior to being assigned to a computer system, identification device 100 may be pulled from a set of identification devices whose statuses are identified by the identification device monitoring system as "available" or some other designation to indicate that identification device 100 is currently not assigned to a computer system.

Figure 2:
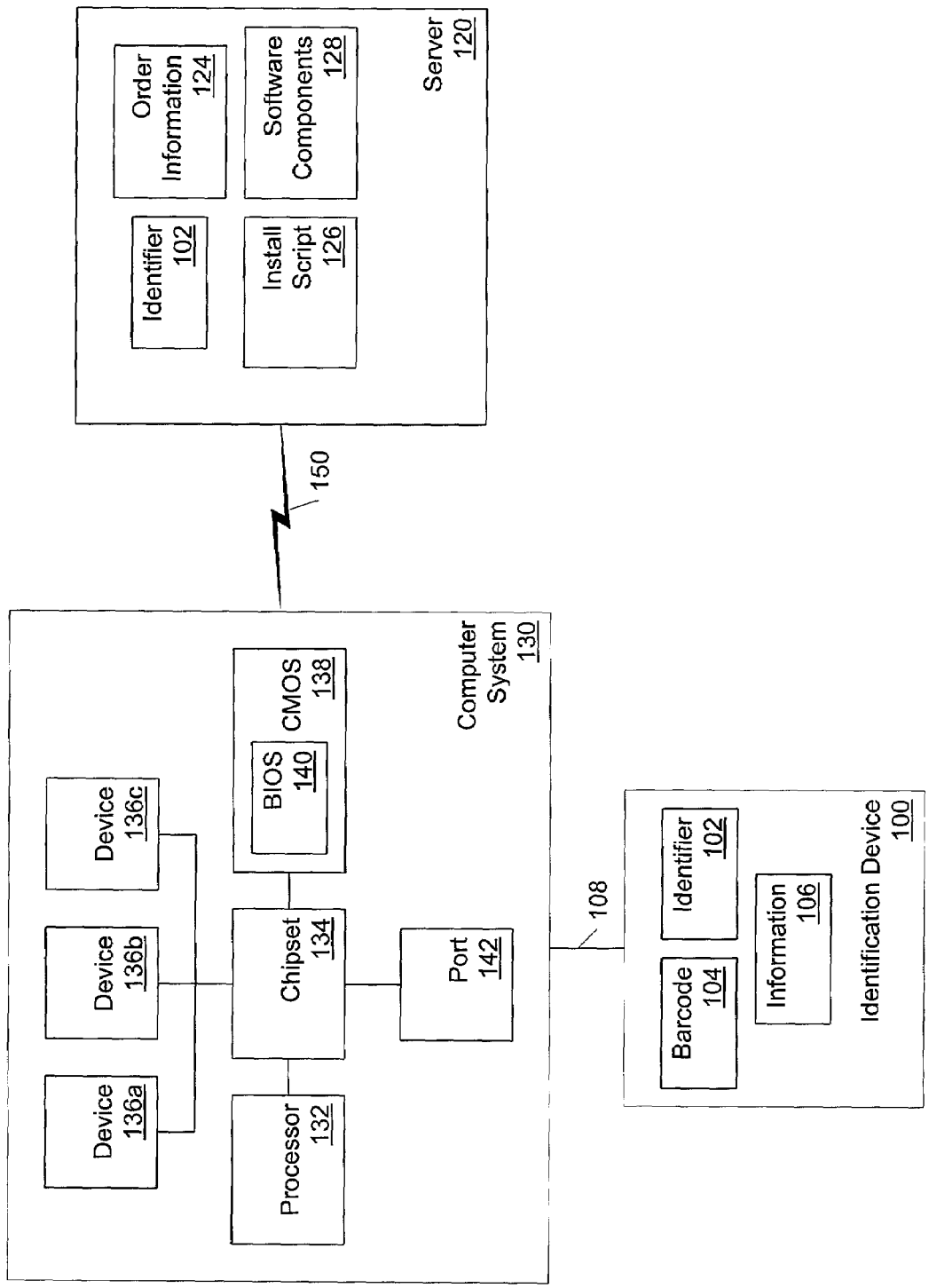
FIG. 2 is a diagram illustrating an embodiment of a system for installing software onto a computer system using an identification device.

FIG. 2 is a diagram illustrating an embodiment of a system 20 for installing software onto a computer system 130 using identification device 120. Computer system 130 may be a build-to-order computer system where one or more hardware and/or software components are specified by a customer. Computer system 130 is coupled to identification device 100 (described above) as indicated by a connection 108. Computer system 130 is also coupled to server 120 (described above) using a communications network 150. Communications network 150 may be a local area network (LAN), a wide area network (WAN), an intranet, a global communications network such the Internet, a wireless connection, a point-to-point connection, or any other connection configured to allow computer system 130 to communicate with server 120.

Computer system 130 includes a processor 132, a chipset 134, a plurality of devices 136*a*, 136*b*, and 136*c*, a CMOS 138, and a port 142. CMOS 138 includes a basic input output system (BIOS) 140. BIOS 140 may be replaced with a system firmware or other boot code in other embodiments. CMOS 138 may also be any other type of non-volatile storage device. Port 142 may be a serial port, a USB port, a parallel port, or any other type of port.

During a manufacturing process of computer system 130, identification device 100 is coupled to port 142 of computer system 130. Identification device 100 may be coupled as part of the process of assembling hardware components of computer system 130. After the hardware components of computer system 130 are assembled and identification device 100 is attached, computer system 130 is powered up, i.e. turned on.

In response to being powered up, computer system 130 boots by executing instructions from BIOS 140. The instructions from BIOS 140 cause identifier 102 to be read from identification device 100 and provided to server 120. In response to receiving identifier 102, server 120 causes identifier 102 to be matched with order information 124 and install script 126. Server 120 causes install script 126 to be executed to cause one or more software components from software components 128 to be installed on computer system 130. These software components may include an operating system, one or more applications, and other information as specified by a customer who ordered computer system 130. Install script 126 detects the software components to install onto computer system 130 in response to accessing a list of software components (not shown) included in order information 124. In other embodiments, the list may be stored remotely from either order information 124 or install script 126 or both. Install script 126 uses the list to cause software components included in the list to be installed onto computer system 130.

In one embodiment, script 126 is provided from server 120 to computer system 130 and executed by computer system 130. In this embodiment, script 126 causes each software component to be accessed from software components 128 and installed onto computer system 130. In another embodiment, script 126 is executed by server 120 to cause each software component to be accessed from software components 128 and installed onto computer system 130.

In one particular embodiment, BIOS 140 includes instructions that support a Preboot Execution Environment (PXE). In this embodiment, instructions in BIOS 140 cause an address such as a MAC address to be broadcast on communications network 150 in response to computer system 130 being powered up. Server 120 detects the address from communications network 150 and causes a network address such as an Internet Protocol (IP) address associated with code to be provided to computer system 130. Computer system 130 receives the network address from server 120 and uses the network address to retrieve the code from server 120. Computer system 130 also provides identifier 102 along with the network address. In response to receiving identifier 102 and the network address, server 120 causes install script 126 to be provided to computer system 130 as part of the code. Computer system 130 executes install script 126 as described above to cause one or more software components to be installed onto computer system 130.

Subsequent to the software components being installed onto computer system 130, additional testing of computer system 130 may be performed. The additional testing may include booting computer system 130 using an installed operating system and running one or more installed applications. The testing may occur while computer system 130 is coupled to a burn rack along with other computer systems undergoing a software installation or other tests.

Before or after any additional testing is performed, identification device 100 is removed from computer system 130. Identification device 100 may be returned to the set of available identification devices and its status may be updated in an identification device monitoring system. Computer system 130 is provided to a customer subsequent to identification device 100 being removed.

Figure 3:
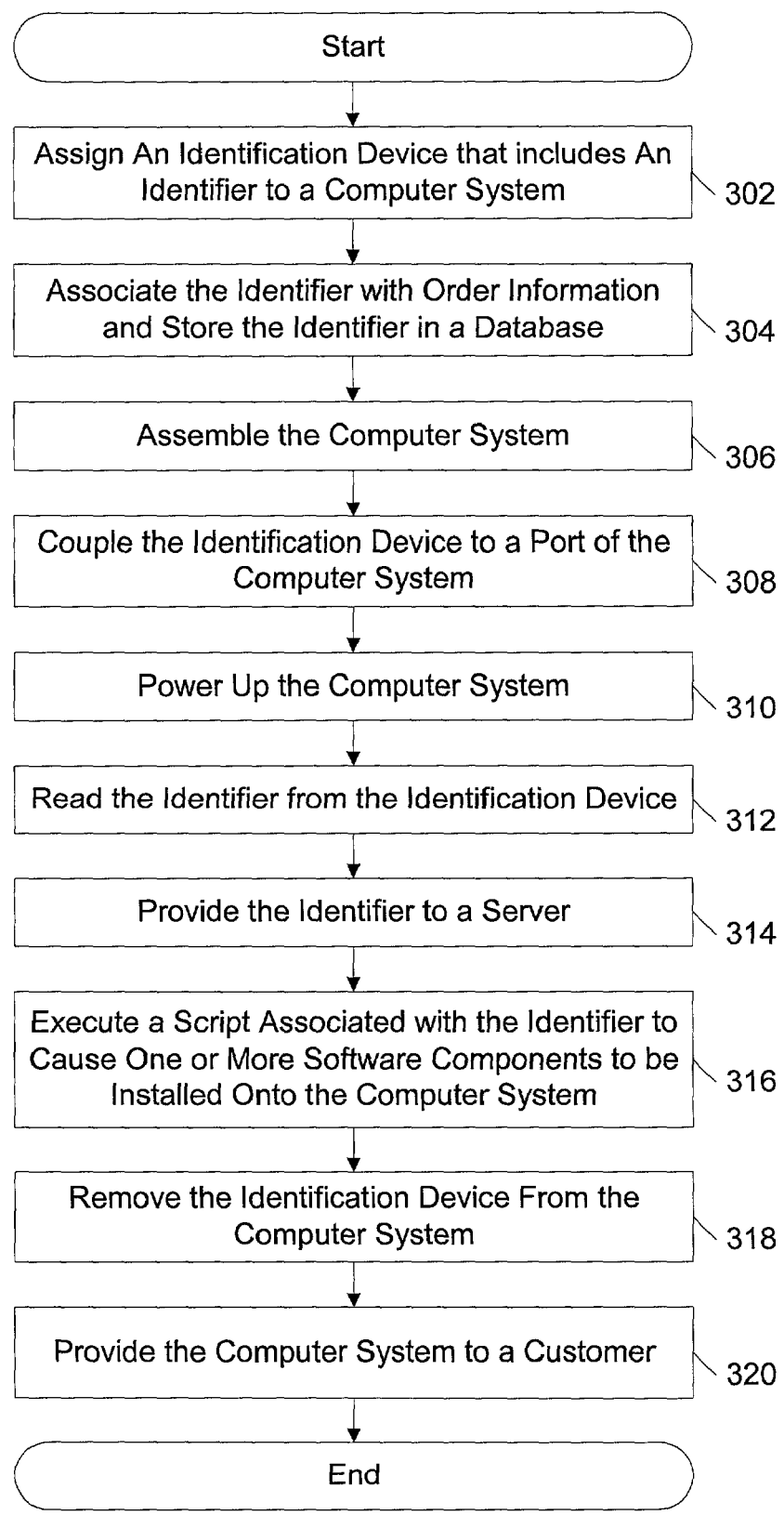
FIG. 3 is a diagram illustrating an embodiment of a method for installing software onto a computer system using an identification device.

FIG. 3 is a diagram illustrating an embodiment of a method for installing software onto a computer system using an identification device. In FIG. 3, an identification device that includes an identifier is assigned to a computer system as indicated in step 302. The identifier is associated with order information and stored in a database as indicated in step 304. The computer system is assembled as indicated in step 306. The identification device is coupled to a port of the computer system as indicated in step 308. The computer system is powered up as indicated in step 310. The identifier is read from the identification device as indicated in step 312. The identifier is provided to a server as indicated in step 314. A script associated with the identifier is executed to cause one or more software components to be installed on the computer system as indicated in step 316. The one or more software components may be identified in a list of software components included with the order information. The identification device is removed from the computer system as indicated in step 318. The identification device may be returned to a pool of identification devices to be used in installing software onto other computer systems. The computer system is provided to the customer as indicated in step 320.

As can be seen, the principal advantages of these embodiments are that various shortcomings of previous techniques are overcome. For example, software may be installed onto a build-to-order computer system in the factory without the need for a floppy disk associated with the computer system.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A system comprising:
   a system BIOS;
   a server including a script associated with a dongle based identification device, an identifier and order information;
   a computer system coupled to the server and including a port;
   the dongle based identification device coupled to the port, the dongle based device including the identifier;
   the computer system configured to:
      in response to being powered up, boot by executing instructions from the BIOS;
   read the identifier from the dongle based device;
   provide the identifier to the server;
   in response to receiving the identifier, the server causing the identifier to be matched with the order information and the script; and
   cause the script associated with the identifier to be executed to cause one or more software components to be installed onto the computer system; and the identifier being removed from the computer system along with the dongle based identification device and returned to a pool of identification devices for reuse.

2. The system of claim 1, wherein the computer system is configured to cause the script to be executed on the computer system.

3. The system of claim 1, wherein the computer system is configured to cause the script to be executed on the server.

4. The system of claim 1, wherein the server includes the one or more software components.

5. The system of claim 1, wherein the order information includes a list of software components to be installed onto the computer system, and wherein the list includes the one or more software components.

6. The system of claim 5, wherein the script is configured to detect the one or more software components to be installed using the list.

7. The system of claim 1, wherein the port comprises a serial port.

8. The system of claim 1, wherein the port comprises a Universal Serial Bus (USB) port.

9. The system of claim 1, wherein the device comprises a programmable device.

10. A method comprising:
    providing a computer system including a system BIOS;
    providing a server including a script associated with a dongle based identification device, an identifier and order information;
    coupling the dongle based identification device to the port, the dongle based device including the identifier;
    configuring the computer system to:
       in response to being powered up, boot by executing instructions from the BIOS;
    read the identifier from the dongle based device;
    provide the identifier to the server;
    in response to receiving the identifier, the server causing the identifier to be matched with the order information and the script; and
    cause the script associated with the identifier to be executed to cause one or more software components to be installed into the computer system; and removing the identifier from the computer system along with the dongle based identification device and returned to a pool of identification devices for reuse.

11. The method of claim 10, further comprising:
    executing the script on the computer system.

12. The method of claim 10, further comprising:
    executing the script on the server.

13. The method of claim 10, further comprising:
    receiving the one or more software components from the server prior to the one or more software components being installed onto the computer system.

14. The method of claim 10, wherein executing the script comprises:
    detecting order information associated with the computer system on the server.

15. The method of claim 14, wherein executing the script comprises:
    accessing a list of software components to be installed onto the computer system from the order information, the list including the one or more software components.

16. The method of claim 15, wherein executing the script comprises:
    causing the one or more software components to be installed onto the computer system in response to detecting the one or more software components from the list.

17. The method of claim 10, further comprising:
    reading the identifier from the device coupled to the port of a computer system, the port comprising a serial port.

18. The method of claim 10, further comprising:
    reading the identifier from the device coupled to the port of a computer system, the port comprising a Universal Serial Bus (USB) port.

19. The system of claim 10, further comprising:
    reading the identifier from the device coupled to the port of a computer system, the device comprising a programmable device.

* * * * *

UNITED STATES PATENT AND TRADEMARK OFFICE
CERTIFICATE OF CORRECTION

PATENT NO. : 7,159,018 B2  Page 1 of 1
APPLICATION NO. : 09/921071
DATED : January 2, 2007
INVENTOR(S) : Hatim Y. Amro et al.

It is certified that error appears in the above-identified patent and that said Letters Patent is hereby corrected as shown below:

Claim 19, Column 6, Line 55, delete "system" and insert --method--.

Signed and Sealed this

Fourth Day of March, 2008

JON W. DUDAS
*Director of the United States Patent and Trademark Office*